(12) United States Patent
Butler (10) Patent No.: US 7,066,548 B2
(45) Date of Patent: Jun. 27, 2006

(54) TAKE-DOWN SEATING

(75) Inventor: David L. Butler, Ravenna, OH (US)

(73) Assignee: Moeller Marine Products, Twinsburg, OH (US)

( * ) Notice: Subject to any disclaimer, the term of this patent is extended or adjusted under 35 U.S.C. 154(b) by 24 days.

(21) Appl. No.: 10/360,428

(22) Filed: Feb. 6, 2003

(65) Prior Publication Data
US 2003/0146653 A1  Aug. 7, 2003

Related U.S. Application Data

(60) Provisional application No. 60/355,652, filed on Feb. 7, 2002.

(51) Int. Cl.
*A47C 7/02* (2006.01)
(52) U.S. Cl. .............. 297/440.1; 297/440.13; 297/440.14; 297/440.15; 297/440.2; 297/440.22; 297/400.23; 297/188.14; 114/363; 403/13; 403/14; 403/403; 312/111; 312/108; 248/108; 248/111
(58) Field of Classification Search .......... 297/440.13, 297/440.1, 440.23, 440.14, 440.2, 440.22, 297/440.15, 188.14; 114/363; 403/13, 14, 403/403; 248/424, 188.1; 312/111, 108
See application file for complete search history.

(56) References Cited

U.S. PATENT DOCUMENTS

| 1,255,406 | A | * | 2/1918 | Gilbert ...................... 403/353 |
| 2,279,864 | A | * | 4/1942 | Eide ............................ 211/189 |
| 3,961,381 | A |   | 6/1976 | Weinhart et al. ................ 5/296 |
| 4,032,188 | A | * | 6/1977 | Jones .......................... 297/232 |
| 4,077,517 | A | * | 3/1978 | Hilemn ........................ 206/577 |
| 4,140,065 | A | * | 2/1979 | Chacon ........................ 108/156 |
| 4,148,106 | A |   | 4/1979 | Gallien ........................... 5/296 |
| 4,436,355 | A | * | 3/1984 | Fortune ..................... 312/270.2 |
| 4,700,916 | A |   | 10/1987 | Bastian et al. ............ 248/225.2 |
| 4,867,327 | A | * | 9/1989 | Roland ...................... 217/12 R |
| 4,867,512 | A | * | 9/1989 | Wilkins et al. .............. 312/245 |
| 5,011,228 | A | * | 4/1991 | Marcantel ............... 297/440.13 |
| 5,351,740 | A |   | 10/1994 | Hanna ........................ 160/135 |
| 5,473,845 | A | * | 12/1995 | Livingston et al. ........... 52/79.9 |
| 5,796,585 | A | * | 8/1998 | Sugiyama et al. ........... 361/735 |
| 6,070,940 | A | * | 6/2000 | Wu ........................ 297/411.28 |
| 6,279,997 | B1 | * | 8/2001 | Moore et al. ............. 297/440.1 |

FOREIGN PATENT DOCUMENTS

| DE | 3634346 A1 | * | 4/1987 |
| WO | WO 9417696 A1 | * | 8/1994 |

* cited by examiner

*Primary Examiner*—Rodney B. White
*Assistant Examiner*—Stephen D. D'Adamo
(74) *Attorney, Agent, or Firm*—William H. Honaker (57) ABSTRACT

A seat assembly (10) for use in a watercraft (12) having a deck (14) is provided. The seat assembly (10) comprises a first portion (16) and a second portion (18) spaced from the first portion (16). First (52) and second (54) connector panels that are separable from and independent of the first (16) and second (18) portions interconnect the first (16) and second (18) portions. A plurality of locking tabs (56) extend from each of the connector panels (52,54) and are inserted into a plurality of slots (58) defined in the portions (16,18) to connect the connector panels (52,54) to the first (16) and second (18) portions. A mounting bracket (84) is attached to a base (82) of each of the connector panels (52,54) and perpendicularly extends from the connector panels (52,54) to mount the connector panels (52,54) to the deck (14) thereby securing the first (16) and second (18) portions to the deck (14).

4 Claims, 12 Drawing Sheets

TAKE-DOWN SEATING

RELATED APPLICATIONS

This application claims priority to provisional patent application Ser. No. 60/355,652 filed on Feb. 7, 2002.

FIELD OF THE INVENTION

The present invention relates to a seat assembly. More specifically, the present invention relates to a multi-piece seat assembly.

BACKGROUND OF THE INVENTION

In the boating industry, a typical method of installation of a seat assembly in boats or other watercraft is to first manufacture and assemble the seat assembly in its entirety at a supplier's facility. The entire seat assembly, as assembled, is then shipped to an original equipment manufacturer (OEM) or distributor's facility where the seat assembly is subsequently mounted to the watercraft.

In such a situation, shipping the entire seat assembly in its fully-assembled form is not only expensive, but inefficient, particularly considering the amount of space that is wasted when an entire assembly is shipped. However, there is also difficulty in shipping the seat assembly components separately. Typically, the seat assembly comprises several components including large and small pieces that can be lost or damaged and that require excessive assembly time at the OEM's facility. In other words, it is generally more efficient for a company in the business of making boat seats to assemble the seat assembly than it is for the OEM purchasing the seat assembly.

As a result, there is a need in the boating industry to fabricate the seat assembly in such a manner as to reduce the shipping expense without creating additional hardships in the final assembly of the seat assembly.

BRIEF SUMMARY OF THE INVENTION

The present invention provides a seat assembly for use on a support surface such as a deck of a watercraft. The seat assembly comprises a first portion and a second portion spaced from the first portion. At least one connector panel is separable from and independent of the first and second portions. The connector panel interconnects the first and second portions. A first locking tab is attached to one of the first portion and the connector panel. A first slot is defined in the other of the first portion and the connector panel to receive the first locking tab to connect the first portion to the connector panel. A second locking tab is attached to one of the second portion and the connector panel. A second slot is defined in the other of the second portion and the connector panel to receive the second locking tab to connect the second portion to the connector panel. A mounting mechanism is attached to the connector panel to mount the connector panel to the support surface thereby securing the first and second portions to the support surface.

A method of assembling the seat assembly on the support surface is also provided. The method comprises the steps of positioning the first and second portions on the support surface, interconnecting the first and second portions with the connector panel, and mounting the connector panel to the support surface to secure the connector panel and the first and second portions to the support surface.

The present invention overcomes the disadvantages of the prior art by providing a seat assembly having separate components, i.e., the first portion, the second portion, and the connector panel. Furthermore, the seat assembly includes the locking tabs to hold the components together and the mounting mechanism to secure the seat assembly to the support surface. Such a system allows suppliers to ship the disassembled components to the OEM or distributor thereby saving packing space and reducing shipping expenses. Furthermore, the ease of assembly reduces assembly time at the OEM's facility.

BRIEF DESCRIPTION OF THE SEVERAL VIEWS OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
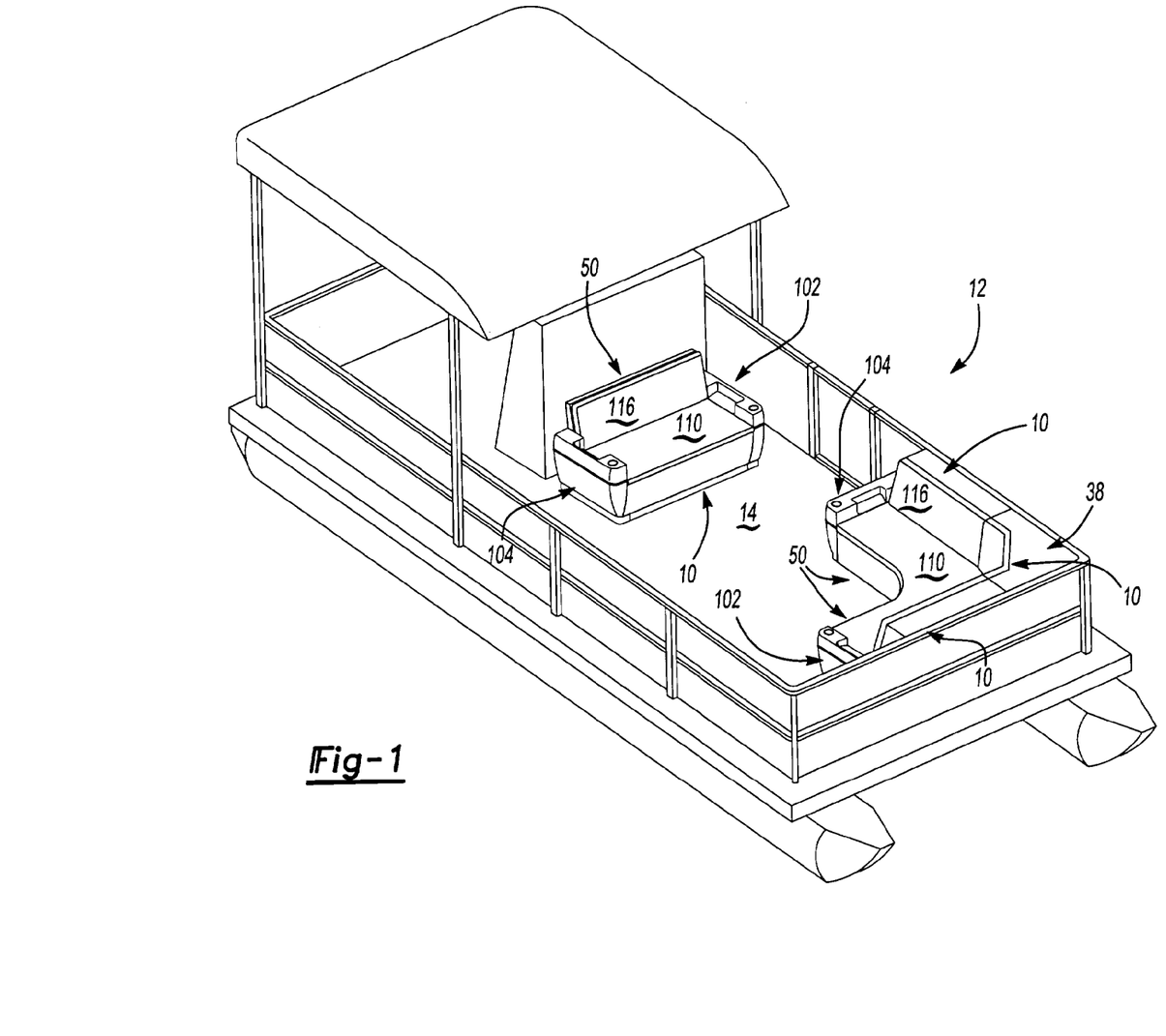
FIG. 1 is a perspective view of a watercraft having a deck supporting multiple seat assemblies of the present invention.
Figures 2, 2A, 2B, 2C:
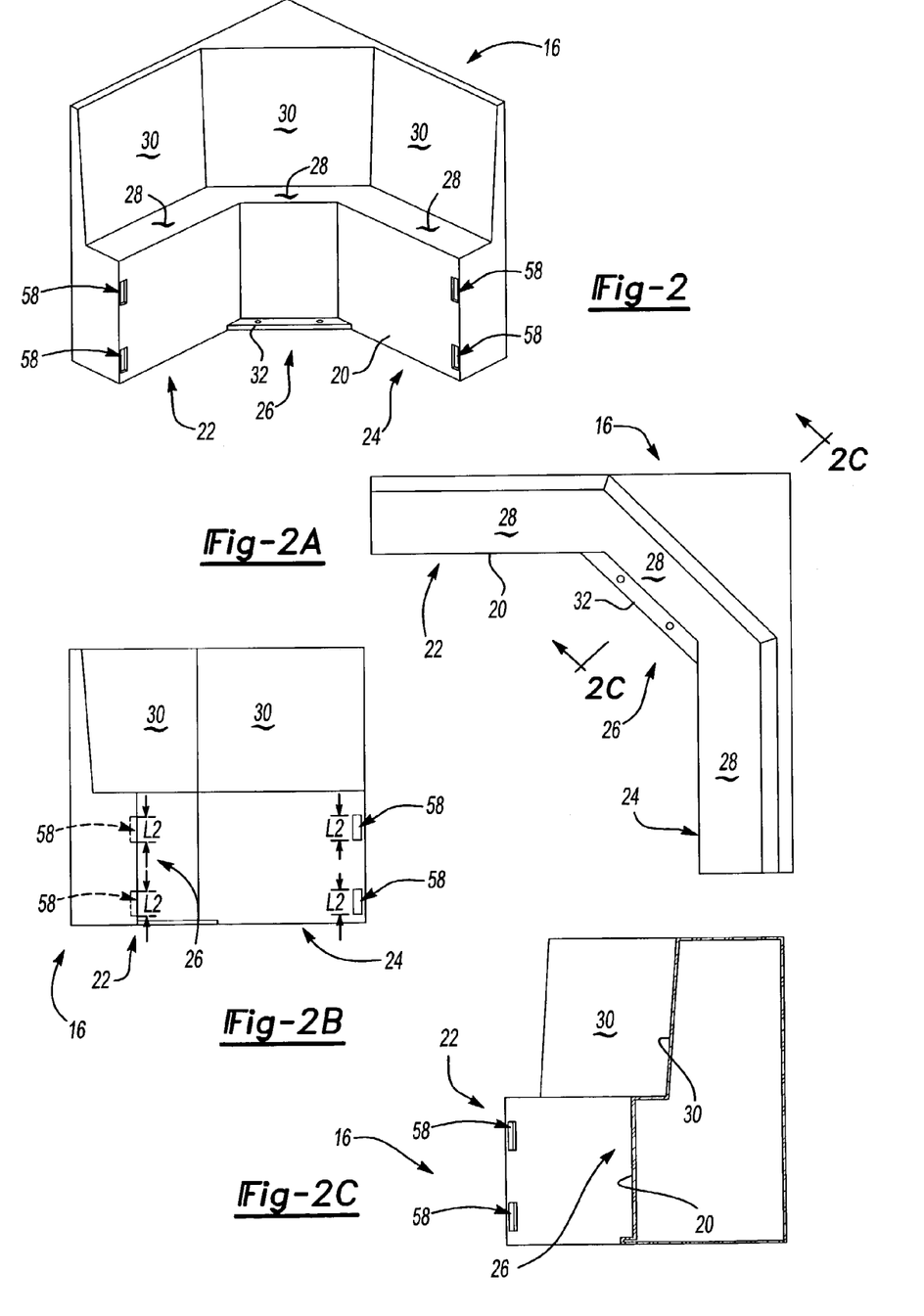
FIG. 2 is a perspective view of a first portion of the present invention.
FIG. 2A is a top view of the first portion of FIG. 2.
FIG. 2B is a left-side elevational view of the first portion of FIG. 2.
FIG. 2C is a cross-sectional view of the first portion of FIG. 2 taken along line 2C—2C of FIG. 2A.
Figures 3, 3A, 3B, 3C:
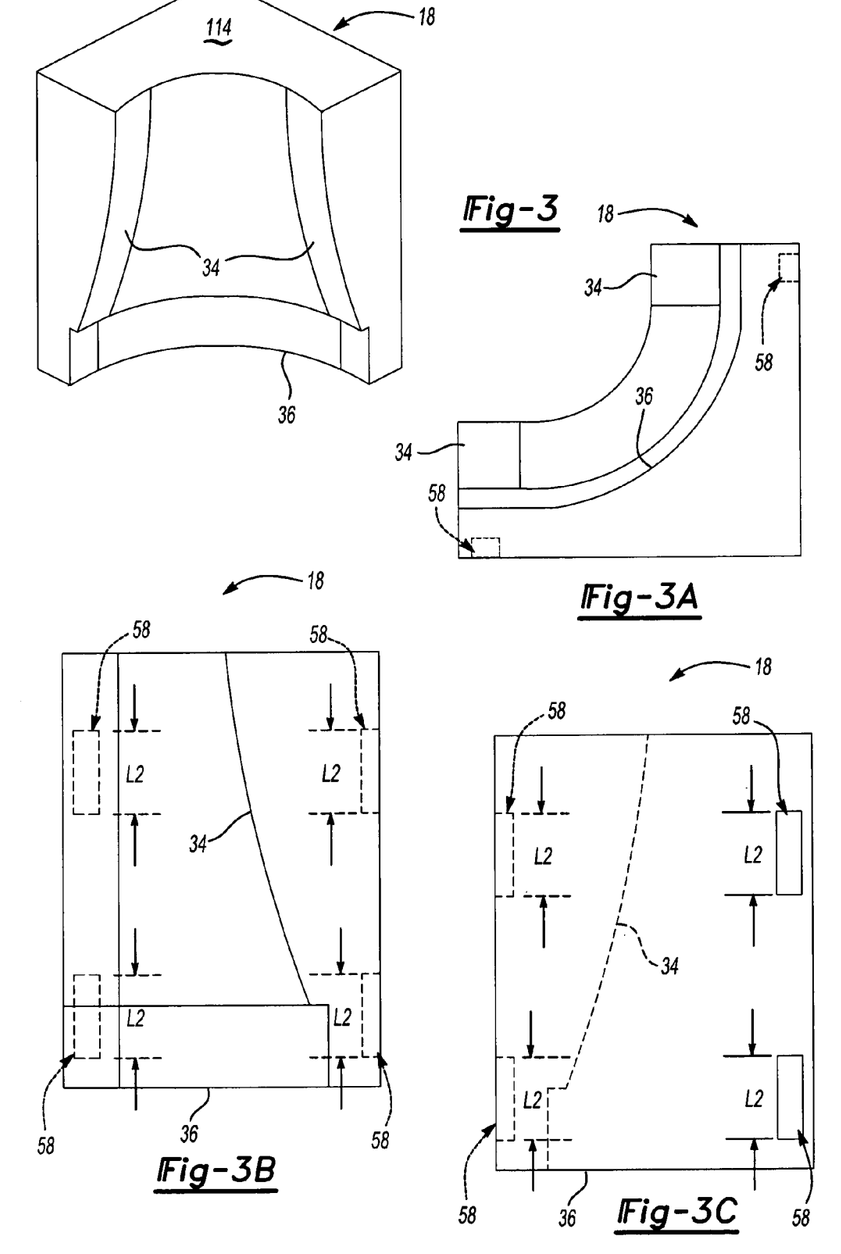
FIG. 3 is a perspective view of a second portion of the present invention.
FIG. 3A is a bottom view of the second portion of FIG. 3.
FIG. 3B is a right-side elevational view of the second portion of FIG. 3.
FIG. 3C is a rear elevational view of the second portion of FIG. 3.

Referring to the Figures, wherein like numerals indicate like or corresponding parts throughout the several views, a seat assembly is generally shown at 10. Referring to FIG. 1, the embodiments of the present invention presented herein illustrate the seat assembly's use in a watercraft 12 such as a pontoon boat. It is to be understood, however, that the seat assembly 10 of the present invention is not limited to use in the watercraft 12. Such seat assemblies 10 may be used in a variety of applications including multi-resident housing, family housing, institutional living, government facilities, shopping centers, business offices, prisons, and so on.

Referring to FIG. 1, multiple seat assemblies 10 are supported by a support surface 14. The support surface 14 can be a floor of a building, a deck of the watercraft 12, a wall, and so on. The seat assemblies 10 of the present invention are constructed of interconnected, individual components. Thus, the present invention is characterized as take-down seating. Several views of the individual components for two embodiments of the present invention are illustrated in FIGS. 2–2C, 3–3C, 4–4C, 5–5C, 6–6B, 7–7C, and 10–10C. However, these two embodiments of the seat assembly 10 are best shown in FIGS. 8 and 9, respectively.

Figure 8:
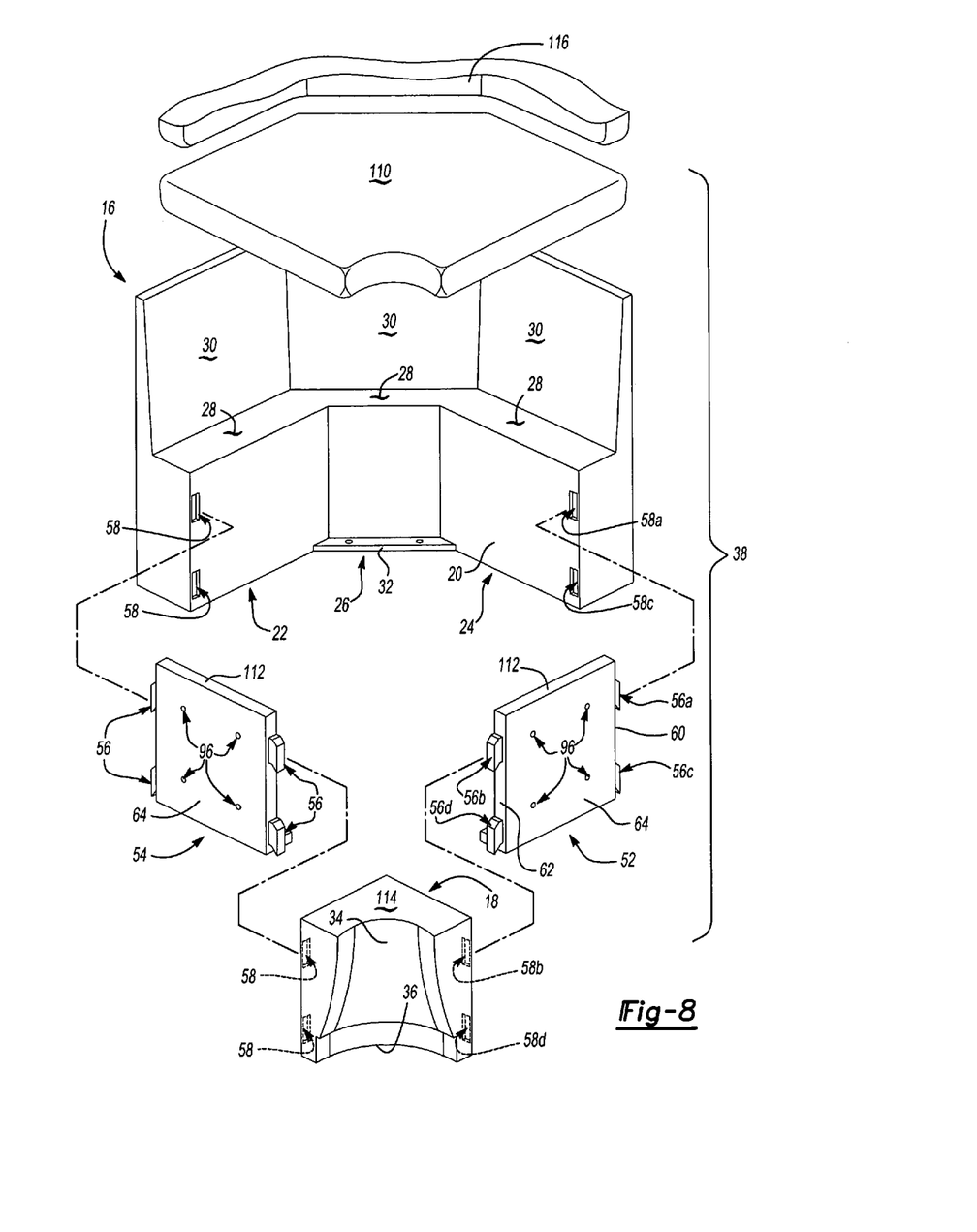
FIG. 8 is an exploded view of a seat assembly of the present invention illustrating the interconnection of the first and second portions by first and second connector panels.

Referring first to FIG. 8, each of the seat assemblies comprise first 16 and second 18 portions, having the appearance of furniture pieces, wherein the first portion 16 is spaced from the second portion 18 on the support surface 14. See briefly FIG. 8A. The first 16 and second 18 portions are preferably formed from rotational molded plastic, i.e., roto-molded plastic, and are hollow and unitary bodies.

In the embodiment of FIG. 8, the first portion 16 has left 22, right 24, and center 26 sections. A bench support surface 28 and back support surface 30 are included at each of the left 22, right 24, and center 26 sections. A mounting base 32 is integrally formed with the first portion 16 at the center 26 section to secure the first portion 16 to the support surface 14. The second portion 18 is generally in the form of a support block having a curved outer face 34 and a semi-circular base 36. In this embodiment, the first 16 and second 18 portions are used to form a corner bench seat 38.

Figure 9:
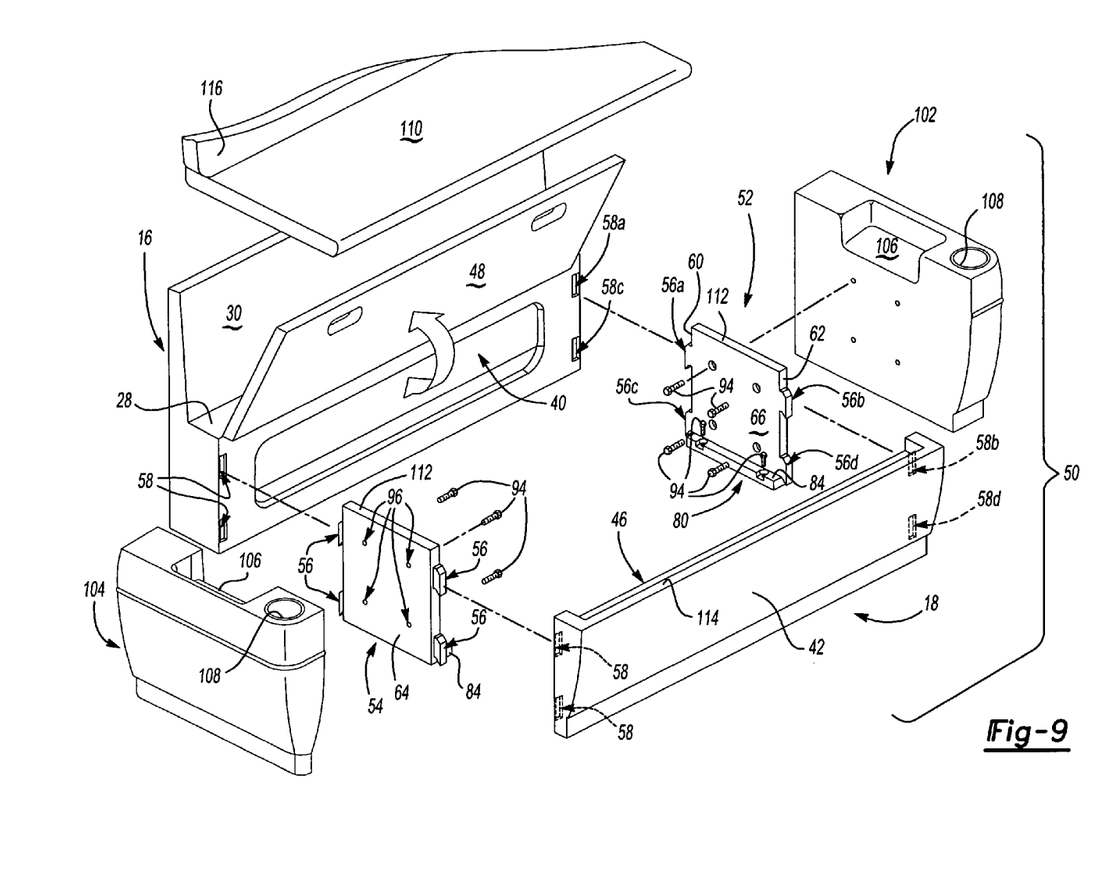
FIG. 9 is an exploded view of a seat assembly of the alternative embodiment illustrating the interconnection of the first and second portions by first and second connector panels.
Figure 9A:
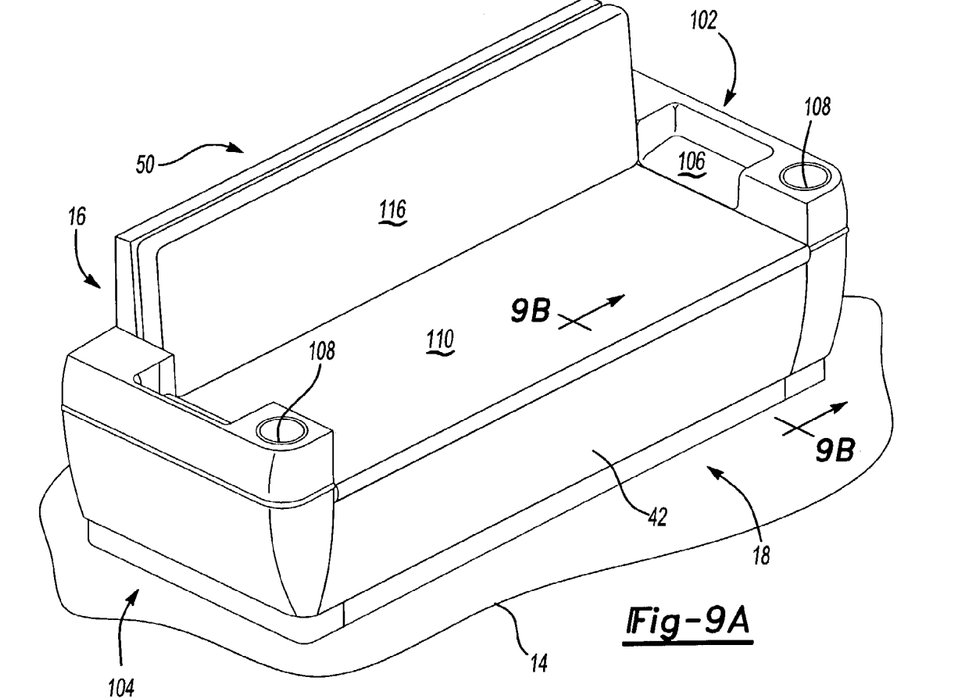
FIG. 9A is a perspective view of the seat assembly of FIG. 9 when fully assembled.

In the second embodiment, referring to FIG. 9, the first portion 16 defines an elongate storage opening 40 therein and has a bench support surface 28 and a back support surface 30. The second portion 18 includes an outer face 42 that is curved and an inner face 44 (see briefly FIG. 7B) defining a ledge 46 therein spaced from the outer face 42. A hinged door 48 may be pivotally mounted to the first portion 16 and received in the ledge 46 to create a storage access point. In this embodiment, the first 16 and second 18 portions are used to form a side bench seat 50.

The portions 16,18, shown in the attached FIGS., are not intended to limit the present invention, but instead are provided for illustrative purposes only. In other words, the present invention does not rely on the configuration of the portions 16,18, but the interconnection of the portions 16,18 to create the seat assembly 10.

Referring to FIGS. 8 and 9, in each embodiment, first 52 and second 54 connector panels that are separable from and independent of the first 16 and second 18 portions interconnect the first 16 and second 18 portions. In other words, the first portion 16, second portion 18, and first 52 and second 54 connector panels are separate components. The connector panels 52,54 may assume any shape. The shape of the connector panels 52,54 is not intended to limit the present invention. The connector panels 52,54 are preferably solid bodies formed of plastic, more preferably, roto-molded plastic.

A plurality of projections 56, hereinafter referred to as locking tabs 56 are attached to each of the connector panels 52,54 to connect the connector panels 52,54 to the portions 16,18. In particular, a plurality of slots 58 are defined in each of the portions 16,18 and the locking tabs 56 are inserted into the slots 58 to interconnect the first 16 and second 18 portions. Hence, each combination of locking tab 56 and slot 58 forms a mechanical interlocking mechanism. It should be appreciated that in alternative embodiments, the locking tabs 56 may be attached to the portions 16,18 and the slots 58 may be defined in the connector panels 52,54, or any combination thereof.

Preferably, each of the first 16 and second 18 portions define four slots 58 therein for receiving two locking tabs 56 from the first connector panel 52 and two locking tabs 56 from the second connector panel 54. Hence, each of the connector panels 52,54 have four locking tabs 56 attached thereto and extending therefrom into four slots 58, two disposed in the first portion 16 and two disposed in the second portion 18. For ease of assembly and manufacture, the connector panels 52,54 and locking tabs 56 of each connector panel 52,54 are identical. Therefore, for purposes of description, only the locking tabs 56 of the first connector panel 52 shall be described in detail. However, it should be understood that the locking tabs 56 of the second connector panel 54 operate in the same manner as the first connector panel 52.

For purposes of describing orientation, the locking tabs 56 of the first connector panel 52 shall be referred to as first 56a, second 56b, third 56c, and fourth 56d locking tabs in FIGS. 8–8B and 9–9B. Likewise, four of the slots 58 defined in the first 16 and second 18 portions shall be referred to as first 58a, second 58b, third 58c, and fourth 58d slots. The first 56a, second 56b, third 56c, and fourth 56d locking tabs correspond respectively to the first 58a, second 58b, third 58c, and fourth 58d slots.

Referring to either FIG. 8 or FIG. 9, the first locking tab 56a is attached to a first end 60 of the first connector panel 52 and is inserted into the first slot 58a defined in the first portion 16. The second locking tab 56b is attached to a second end 62 of the first connector panel 52 and is inserted into the second slot 58b defined in the second portion 18. The third locking tab 56c is attached to the first end 60 of the first connector panel 52 below the first locking tab 56a and in the same plane as the first locking tab 56a. The third locking tab 56c is inserted into the third slot 58c defined in the first portion 16. The fourth locking tab 56d is attached to the second end 62 of the first connector panel 52 below the second locking tab 56b and in the same plane as the second locking tab 56*b*. The fourth locking tab 56*d* is inserted into the fourth slot 58*d* defined in the second portion 18.

The number of locking tabs 56 attached to the connector panels 52,54 and the number of slots 58 defined by the portions 16,18 for receiving the locking tabs 56 is not to be limited to eight, i.e., four locking tabs 56 from each of the connector panels 52,54 and four slots 58 defined in each of the portions 16,18.

The locking tabs 56 may come in a variety of shapes and can be separate components that are mechanically connected to the connector panels 52,54. Preferably, however, the locking tabs 56 are integrally formed with the connector panels 52,54. Hence, the locking tabs 56 are formed from roto-molded plastic. Referring specifically to FIG. 9, each of the connector panels 52,54 have outer 64 and inner 66 side faces and the locking tabs 56 are flush with the inner side face 66 and offset from the outer side face 64 such that the outer side face 64 is flush with the first 16 and second 18 portions when the connector panels 52,54 are connected thereto.

Figures 10, 10A:
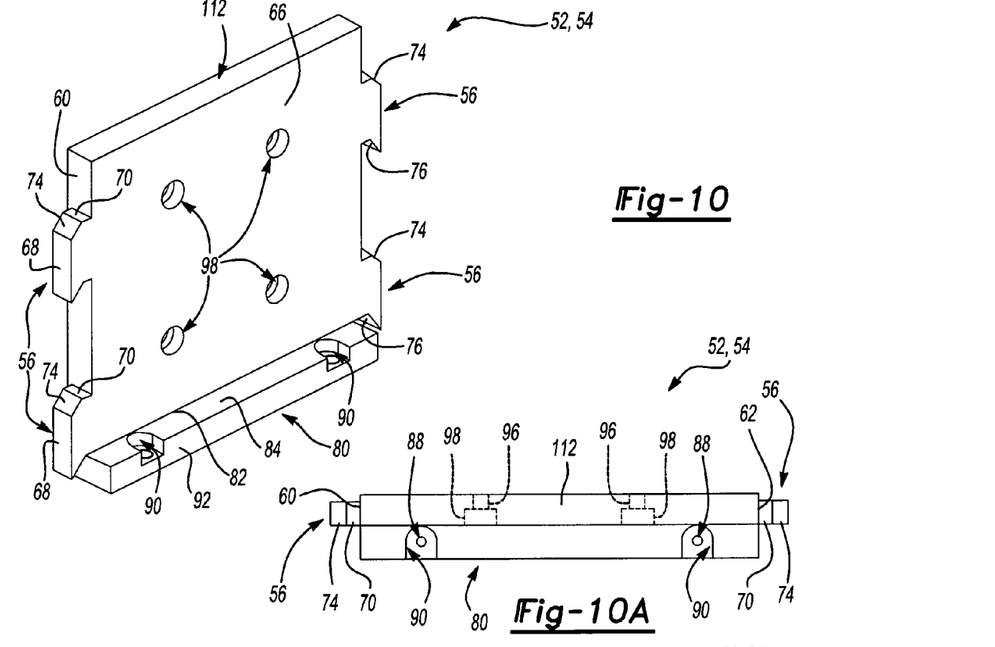
FIG. 10 is a perspective view of a connector panel.
FIG. 10A is a top view of the connector panel of FIG. 10.
Figure 10B:
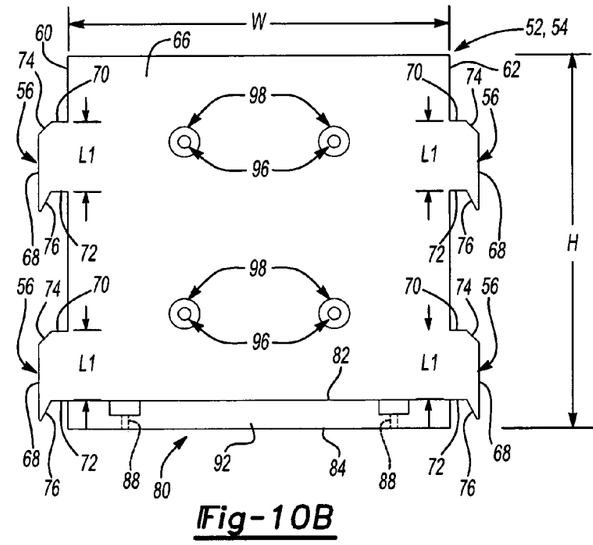
FIG. 10B is a front elevational view of the connector panel of FIG. 10.
Figure 10C:
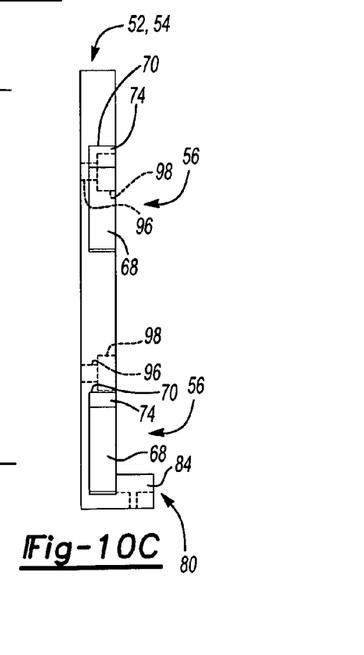
FIG. 10C is a left-side elevational view of the connector panel of FIG. 10.

Referring to FIG. 10B, each of the locking tabs 56 are generally hook-shaped and include a front face 68, a top face 70 parallel to and spaced from a bottom face 72, and first 74 and second 76 angled faces interconnecting the front face 68 and the top 70 and bottom 72 faces.

Still referring to FIG. 10B, each of the locking tabs 56 have a length L1 between the top 70 and bottom 72 faces equal to a length L2 of each of the slots 58 to provide a snug fit between the connector panels 52,54 and the portions 16,18. Preferably, the length L1 between the top 70 and bottom 72 faces of each of the locking tabs 56 is at least sixteen percent of a height H of each of the connector panels 52,54 and at least sixteen percent of a width W of each of the connector panels 52,54. More preferably, the length L1 between the top 70 and bottom 72 faces of each of the locking tabs 56 is between eighteen and twenty percent of the height H of each of the connector panels 52,54. These proportions provide relatively large locking tabs 56 to provide a robust seat assembly 10 thereby strengthening the connections between the connector panels 52,54 and the first 16 and second 18 portions.

In addition, the top 70 and bottom 72 faces of each of the locking tabs 56 have an equal width matching a width of each of the slots 58 and an equal depth matching a thickness of outer walls 20 of each of the portions 16,18. The thickness of the outer walls 20 relates to the depth of the slots 58 since the slots 58 are disposed in the outer walls 20. Ultimately, the dimensions of each locking tab 56 between the top 70 and bottom 72 faces matches the dimensions of each slot 58 to further provide the snug fit between the connector panels 52,54 and the portions 16,18.

Figure 8A:
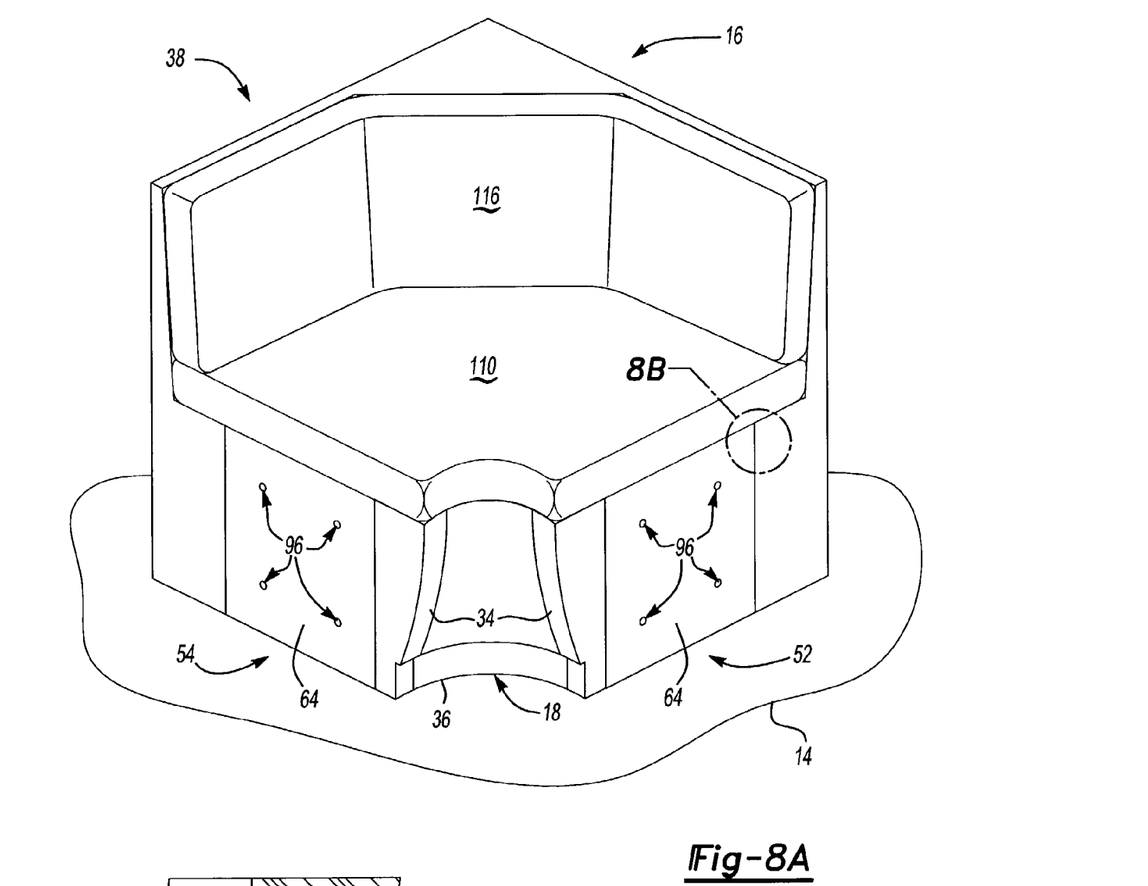
FIG. 8A is a perpective view of the seat assembly of FIG. 8 when fully assembled.
Figure 8B:
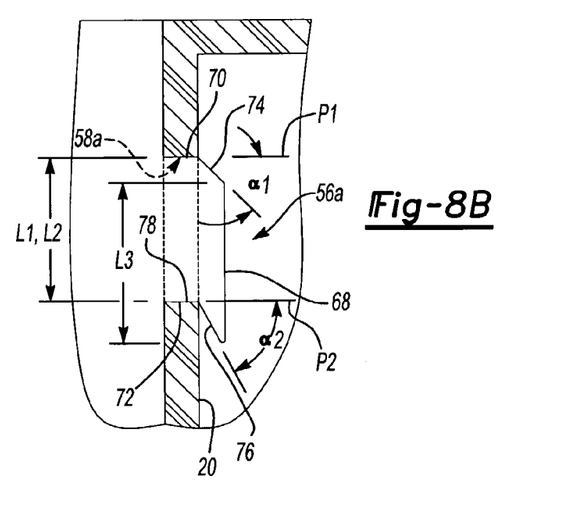
FIG. 8B is a blow-up view illustrating a locking tab and slot for receiving the locking tab.

Referring to FIG. 8B, the first angled face 74 of each of the locking tabs 56 is at a first angle $\alpha 1$ to a horizontal plane P1 and the second angled face 76 of each of the locking tabs 56 is at a second angle $\alpha 2$ to a horizontal plane P2. The second angle $\alpha 2$ is greater than the first angle $\alpha 1$. For instance, the first angle $\alpha 1$ may be between zero and sixty degrees, more preferably, forty-five degrees, and the second angle $\alpha 2$ may be between forty and ninety degrees, more preferably, fifty-three degrees.

Still referring to FIG. 8B, the front face 68 of each of the locking tabs 56 has a length L3 that is greater than the length L2 of each of the slots 58. This assists the locking tabs 56 in cradling the outer wall 20 of each of the portions 16,18 when the locking tabs 56 are inserted into the slots 58. The cradling is a result of the locking tabs 56 extending below the slots 58 once the locking tabs 56 are in place within the slots 58 and the bottom face 72 of each of the locking tabs engaging a bottom 78 of each of the slots 58. A tip of each of the locking tabs 56, defined between the front face 68 and the second angled face 76, may be flexible to facilitate entry of the locking tabs 56 into the slots 58. Likewise, the outer walls 20 of each of the portions 16,18 may be flexible to facilitate entry of the locking tabs 56 into the slots 58.

Referring to FIG. 10, a mounting mechanism 80 is attached to each of the connector panels 52,54 to mount the connector panels 52,54 to the support surface 14 thereby securing the first 16 and second 18 portions to the support surface 14. Each of the connector panels 52,54 includes a base 82 and each of the mounting mechanisms 80 includes a mounting bracket 84 attached to the base 82. The mounting bracket 84 is integral with the base 82, and thus, the mounting bracket 84 is also formed of roto-molded plastic. The mounting bracket 84 extends perpendicularly to the base 82 of each of the connector panels 52,54 and the locking tabs 56. The connector panels 52,54 and the first 16 and second 18 portions define an open cavity (not shown) therebetween when assembled, and the mounting bracket 84 of each of the connector panels 52,54 extends into the open cavity to hide the mounting brackets 84 when the seat assembly 10 is trimmed and finished.

It should be appreciated that the mounting mechanism 80 could include any suitable mechanism for mounting the connector panels 52,54 to the support surface 14. For instance, the mounting mechanism 80 could be a hinge, a plurality of fasteners extending through the connector panels 52,54 into the support surface 14, a snap-fit tab attached to the connector panels 52,54 for inserting into a snap-fit groove in the support surface 14, a tongue and groove lock, a weld, a bolted connection, and the like.

Figure 9B:
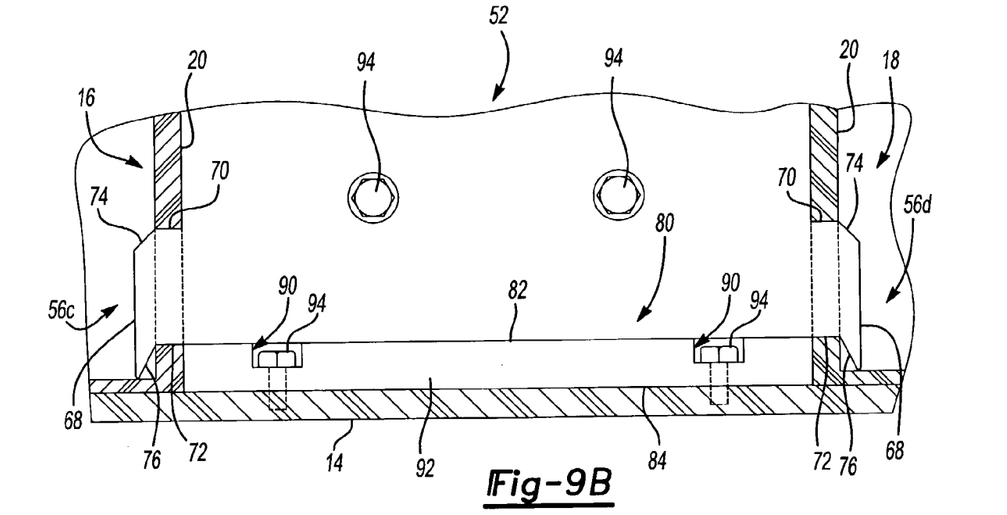
FIG. 9B is a blow-up view illustrating a mounting bracket attached to a support surface.

Referring to FIG. 10A, the mounting brackets 84 define a plurality of mounting holes 88 extending therethrough. A semi-circular notch 90 surrounds each of the mounting holes 88 to provide access to the mounting holes 88. Preferably, the mounting brackets 84 are rectangular in shape and define two mounting holes 88 accessible through two semi-circular notches 90 formed in a front edge 92 of each of the mounting brackets 84. Referring back to FIG. 9, fasteners 94 are used to connect the mounting brackets 84 via the two mounting holes 88 to the support surface 14. A variety of fasteners 94 can be used including screws, nuts and bolts, rivets, and the like. The fasteners 94 may be corrosion resistant to be optimal for use with watercraft 12. FIG. 9B best shows the mounting of the first connector panel 52 to the support surface 14. Of course, the second connector panel 54 is mounted to the support surface 14 in the same fashion. As will be appreciated, by securing the connector panels 52,54 to the support surface 14, the first 16 and second 18 portions are secured in place due to the interaction of the locking tabs 56 and slots 58.

Each of the connector panels 52,54 defines a plurality of mounting bores 96 therethrough having equal size. The mounting bores 96 are concentrically defined within outer receiving bores 98 to receive fasteners 94 to mount trim pieces to the connector panels 52,54. The mounting bores 96 could also be used to connect adjacent connector panels 52,54 of adjacent seat assemblies 10. For instance, referring back to FIG. 1, the pontoon illustrated therein has three abutting seat assemblies 10. Each of the seat assemblies 10 is adjacent to at least one other seat assembly 10. Hence, these seat assemblies 10 could be further secured together by locking adjacent connector panels 52,54.

Figures 4, 4A:
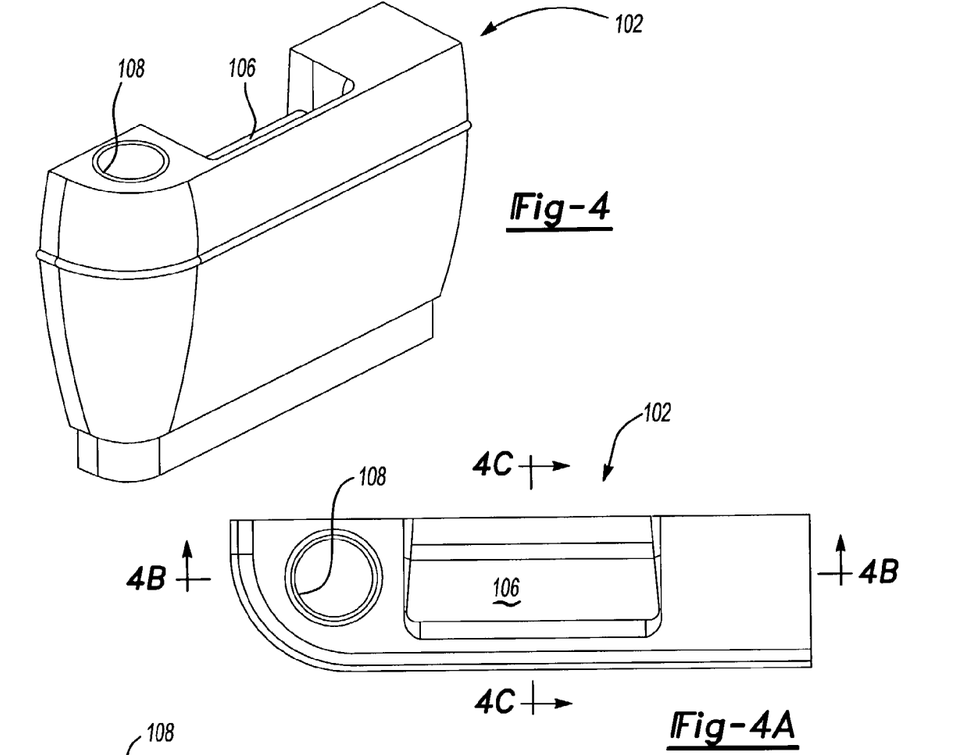
FIG. 4 is a perspective view of a first trim piece.
FIG. 4A is a top view of the first trim piece of FIG. 4.
Figure 4B:
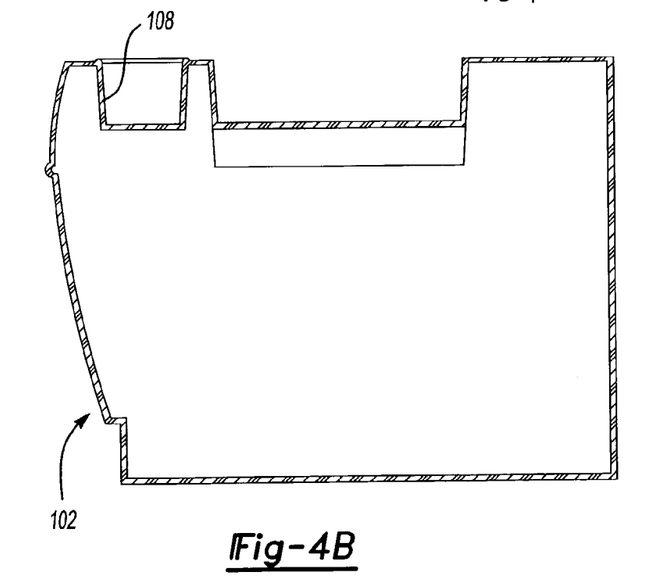
FIG. 4B is a cross-sectional view of the first trim piece of FIG. 4 taken along line 4B—4B of FIG. 4A.
Figure 4C:
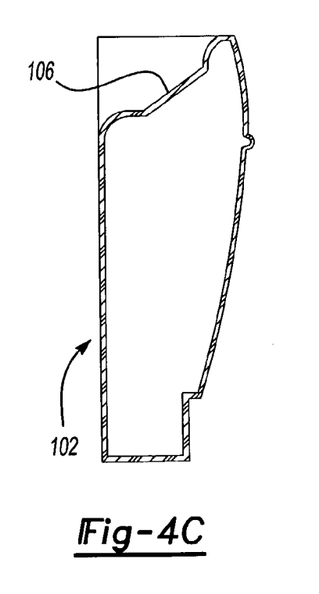
FIG. 4C is a cross-sectional view of the first trim piece of FIG. 4 taken along line 4C—4C of FIG. 4A.
Figures 5, 5A:
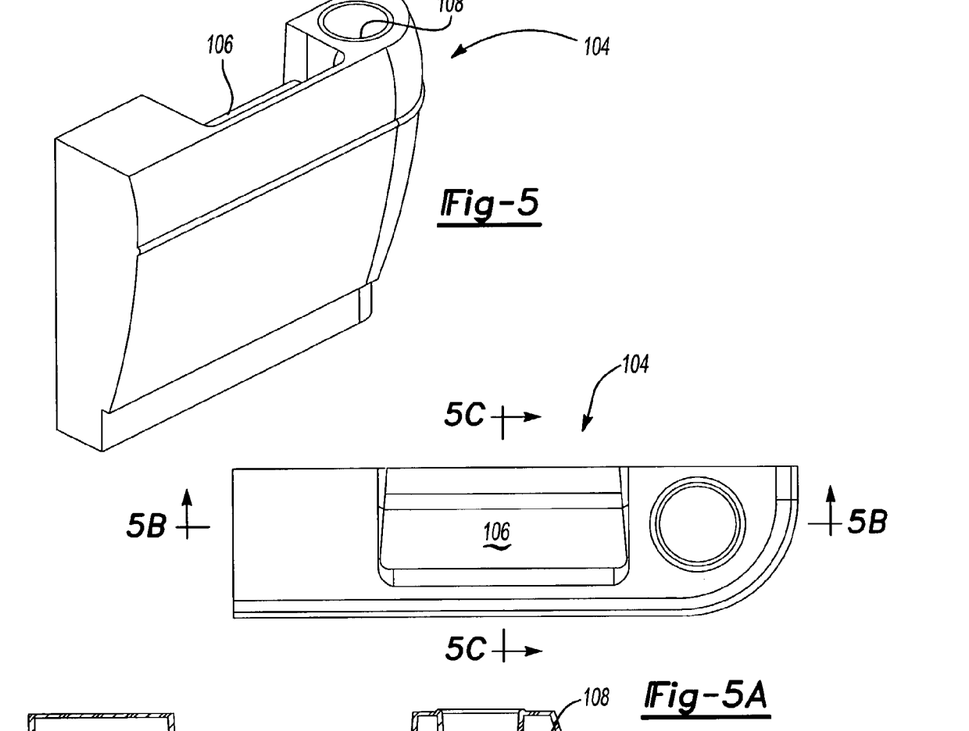
FIG. 5 is a perspective view of a second trim piece.
FIG. 5A is a top view of the second trim piece of FIG. 5.
Figures 5B, 5C:
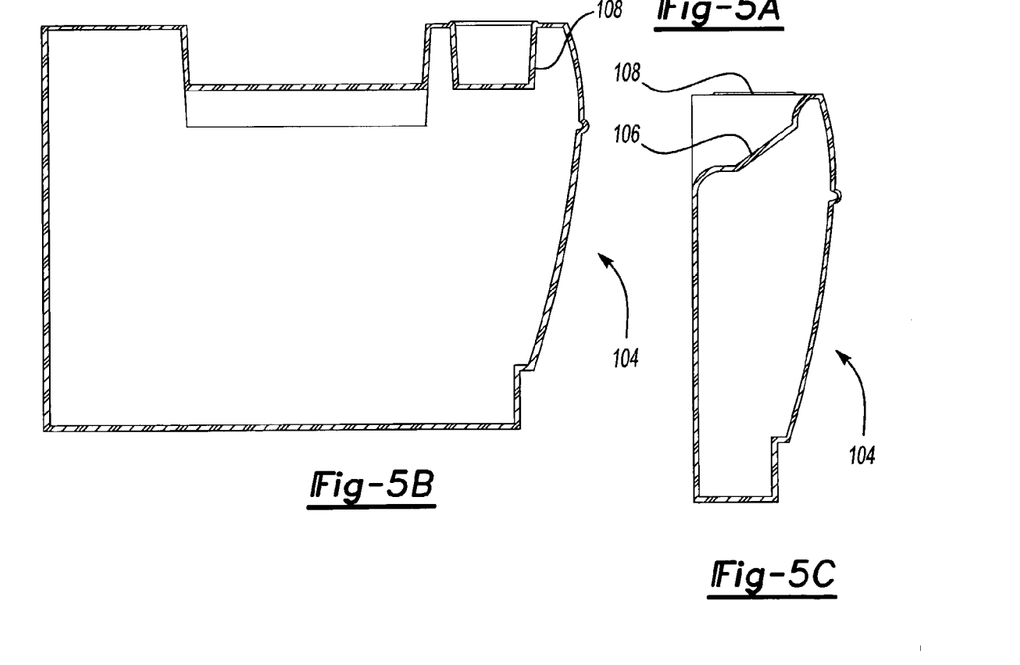
FIG. 5B is a cross-sectional view of the second trim piece of FIG. 5 taken along line 5B—5B of FIG. 5A.
FIG. 5C is a cross-sectional view of the second trim piece of FIG. 5 taken along line 5C—5C of FIG. 5A.
Figure 6:
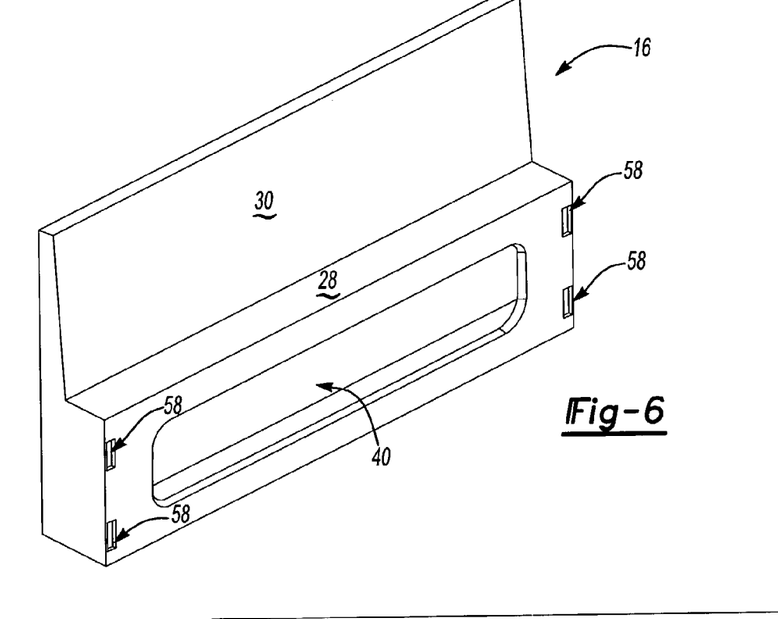
FIG. 6 is a perspective view of a first portion of an alternative embodiment of the present invention.
Figure 6A:
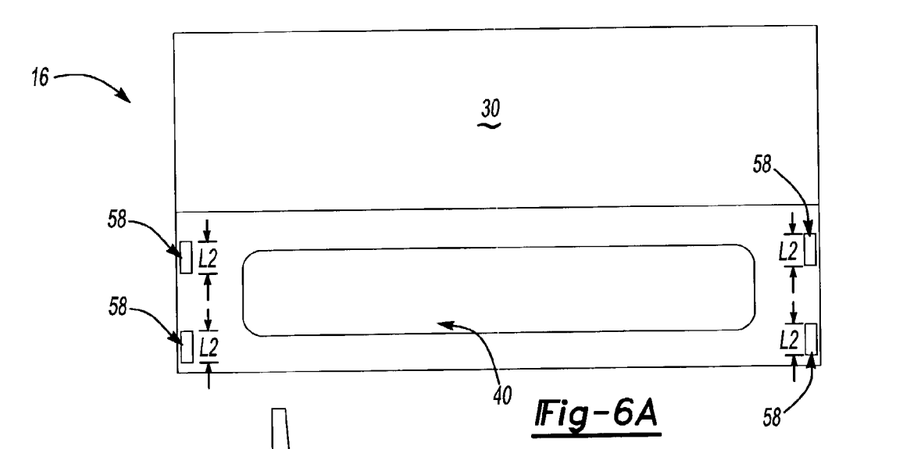
FIG. 6A is a front elevational view of the first portion of FIG. 6.
Figure 6B:
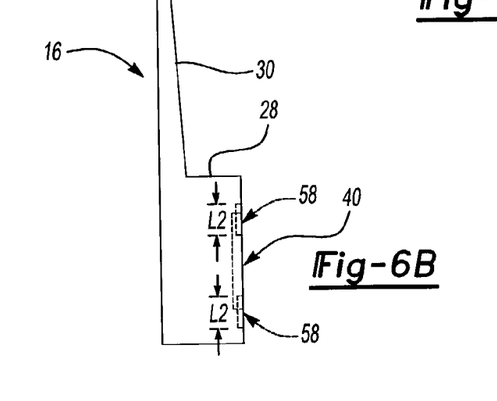
FIG. 6B is a left-side elevational view of the first portion of FIG. 6.
Figure 7:
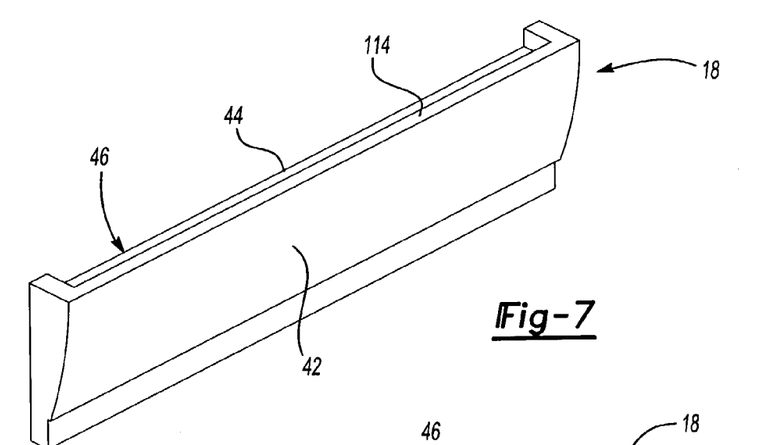
FIG. 7 is a perspective view of a second portion of the alternative embodiment of the present invention.
Figure 7A:
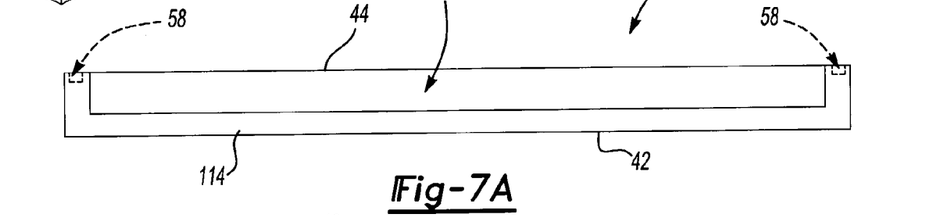
FIG. 7A is a top view of the second portion of FIG. 7.
Figure 7B:
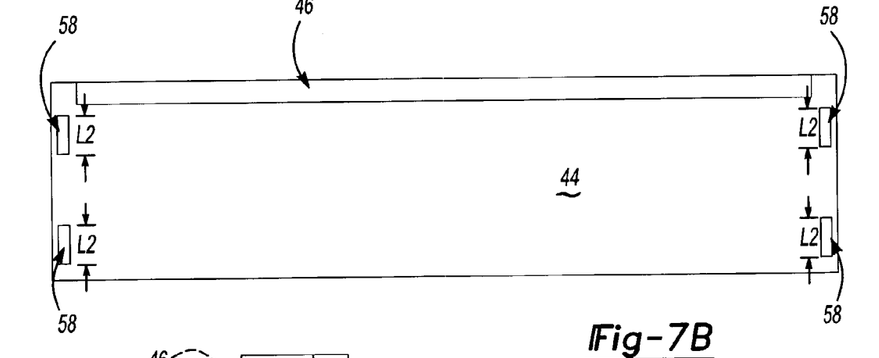
FIG. 7B is a rear elevational view of the second portion of FIG. 7.
Figure 7C:
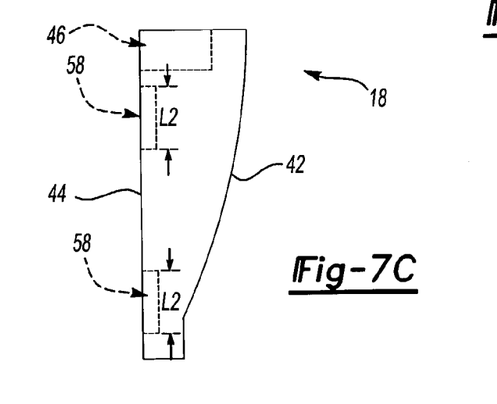
FIG. 7C is a left-side elevational view of the second portion of FIG. 7.

First 102 and second 104 trim pieces, best shown in FIGS. 4–4C and 5 . 5C, may be mounted to the outer side faces 64 of the connector panels 52,54, as illustrated in FIG. 9. The first 102 and second 104 trim pieces can be attached via the fasteners 94 extending through the plurality of mounting bores 96. The fasteners 94 may be similar to the fasteners 94 used to mount the connector panels 52,54 to the support surface 14. Referring to FIG. 9, the first 102 and second 104 trim pieces each include an armrest 106 and beverage holder 108. The trim pieces 102,104 can serve a variety of purposes to refine the seat assembly 10 and provide added utility and aesthetic appeal. In FIG. 9, the first 102 and second 104 trim pieces are shown to finish the side bench seat 50. In FIGS. 8 and 8A, no trim pieces are shown, but a combination of two seat assemblies 10 of FIG. 9 (each with only one of the trim pieces 102,104) can be connected to the corner bench seat 38 of FIG. 8A, as illustrated in FIG. 1.

Once the trim pieces 102,104 are in place, a bench seat 110 can be attached to the bench support surface 28 of the first portion 16, to a top edge 112 of each of the connector panels 52,54, and to a support surface 114 of the second portion 18. In addition, a back cushion 116 can be attached to the back support surface 30 of the first portion 16. The bench seat 110 and back cushion 116 can be attached by any conventional methods known to those skilled in the art, and each may comprise a rigid panel and foam cushion enclosed by a vinyl or leather cover.

Those skilled in the art will appreciate that although the first 16 and second 18 portions, the connector panels 52,54, the locking tabs 56, and the mounting bracket 84 are described as being formed by rotational molded plastic, these components could be formed by other materials and/or methods. For instance, these components could be formed from injection molded plastic, or they could be thermoform components.

A method of assembling the seat assembly 10 on the deck 14 or other support surface 14 will now be described. To start, the first 16 and second 18 portions are positioned on the support surface 14 and spaced from one another. The first 16 and second 18 portions are then interconnected by the first 52 and second 54 connector panels by inserting the plurality of locking tabs 56 into the corresponding slots 58. Finally, the connector panels 52,54 are mounted to the support surface 14. This includes fastening the mounting brackets 84 to the support surface 14.

The method of assembling the seat assembly 10 further includes cradling the outer walls 20 of the first 16 and second 18 portions with the plurality of locking tabs 56 to further secure the portions 16,18 to the support surface 14. The trim pieces 102,104 are attached as needed. To finish the seat assembly 10, the bench seat 110, supported by the first 16 and second 18 portions and the connector panels 52,54, is attached and the back cushion 116 is attached to the first portion 16.

Obviously, many modifications and variations of the present invention are possible in light of the above teachings. The invention may be practiced otherwise than as specifically described within the scope of the appended claims.

What is claimed is:

1. A seat assembly (10) for use on a support surface (14), comprising:
   a first portion (16);
   a second portion (18) spaced from said first portion (16);
   at least one connector panel (52) separable from and independent of said first (16) and second (18) portions for interconnecting said first (16) and second (18) portions;
   a first locking tab (56a) attached to one of said first portion (16) and said connector panel (52) and a first slot (58a) defined in the other of said first portion (16) and said connector panel (52) for receiving said first locking tab (56a) to connect said first portion (16) to said connector panel (52);
   a second locking tab (56b) attached to one of said second portion 918) and said connector panel (52) and a second slot (58b) defined in the other of said second portion (18) and said connector panel (52) for receiving said second locking tab (56b) to connect said second portion (18) to said connector panel (52);
   wherein each of said locking tabs (56a, 56b) are generally hook-shaped and include a front face (68), a top face (70) parallel to and spaced from a bottom face (72), and first (74) and second (76) angled faces interconnecting said front face (68) and said top (70) and bottom (72) faces;
   wherein said front face (68) of each of said locking tabs (56a, 56b) has a length (L3) that is greater than a length (L2) of each of said slots (58A, 58b); and
   a mounting mechanism (80) attached to said connector panel (52) for mounting said connector panel (52) to the support surface (14) thereby securing said first (16) and second (18) portions to the support surface (14).

2. A seat assembly (10) for use on a support surface (14), comprising:
   a first portion (16);
   a second portion (18) spaced from said first portion (16);
   at least one connector panel (52) separable from and independent of said first (16) and second (18) portions for interconnecting said firs (16) and second (18) portions;
   a first locking tab (56a) attached to one of said first portion (16) and said connector panel (52) and a first slot (58a) defined in the other of said first portion (16) and said connector panel (52) for receiving said first locking tab (56a) to connect said first portion (16) to said connector panel (52);
   a second locking tab (56b) attached to one of said second portion (18) and said connector panel (52) and a second slot (58b) defined in the other of said second portion (18) and said connector panel (52) for receiving said second locking tab (56b) to connect said second portion (18) to said connector panel (52);
   wherein each of said locking tabs (56a, 56b) are generally hook-shaped and include a front face (68), a top face (70) parallel to and spaced from a bottom face (72), and first (74) and second (76) angled faces interconnecting said front face (68) and said top (70) and bottom (72) faces;
   wherein each of said locking tabs (56a, 56b) have a length (L1) between said top (70) and bottom (72) faces equal to a length (L2) of each of said slots (58a, 58b) of said portions (16, 18) for providing a snug fit between said connector panel (52) and said portions (16, 18);
   wherein said top (70) and bottom (72) faces of each of said locking tabs (56a, 56b) have a width equal to a width of each of said slots (58a, 58b) for further providing the snug fit between said connector panel (52) and said portions (16, 18); and
   a mounting mechanism (80) attached to said connector panel (52) for mounting said connector panel (52) to the support surface (14) thereby securing said connector panel (52) and said first (16) and second (18) portions to the support surface (14).

3. A seat assembly (10) for use on a support surface (14), comprising:

a first portion (16);

a second portion (18) spaced from said first portion (16);

at least one connector panel (52) separable from and independent of said first (16) and second (18) portions for interconnecting said first (16) and second (18) portions;

a first locking tab (56*a*) attached to one of said first portion (16) and said connector panel (52) and a first slot (58*a*) defined in the other of said first portion (16) and said connector panel (52) for receiving said first locking tab (56*a*) to connect said first portion (16) to said connector panel (52);

a second locking tab (56*b*) attached to one of said second portion (18) and said connector panel (52) and a second slot (58*b*) defined in the other of said second portion (18) and said connector panel (52) for receiving said second locking tab (56*b*) to connect said second portion (18) to said connector panel (52);

a mounting mechanism (80) attached to said connector panel (52) for mounting said connector panel (52) to the support surface (14) thereby securing said connector panel (52) and said first (16) and second (18) portions to the support surface (14); and wherein said connector panel (52) has outer (64) and inner (66) side faces and said locking tabs (56*a*, 56*b*) are offset from said outer side face (64) such that said outer side face (64) is flush with said first (16) and second (18) portions when said connector panel (52) is connected to said portions (16, 18).

4. A seat assembly (10) for use on a support surface (14), comprising:

a first portion (16);

a second portion (18) spaced from said first portion (16);

at least one connector panel (52) separable from and independent of said first (16) and second (18) portions for interconnecting said first (16) and second (18) portions;

a first locking tab (56*a*) attached to one of said first portion (16) and said connector panel (52) and a first slot (58*a*) defined in the other of said first portion (16) and said connector panel (52) for receiving said first locking tab (56*a*) to connect said first portion (16) to said connector panel (52);

a second locking tab (56*b*) attached to one of said second portion (18) and said connector panel (52) and a second slot (58*b*) defined in the other of said second portion (18) and said connector panel (52) for receiving said second locking tab (56*b*) to connect said second portion (18) to said connector panel (52);

a mounting mechanism (80) attached to said connector panel (52) for mounting said connector panel (52) to the support surface (14) thereby securing said first (16) and second (18) portions to the support surface (14); and wherein said first (16) and second (18) portions comprise hollow and unitary bodies and said first portion (16) defines an elongate storage opening (40) therein and has a bench support surface (28) and a back support surface (30) and said second portion (18) includes an outer face (42) that is curved.

* * * * *